(12) United States Patent
Caspari et al.

(10) Patent No.: US 10,995,780 B2
(45) Date of Patent: May 4, 2021

(54) ACTUATORS FOR FLOW CONTROL AT SURFACES OF AERODYNAMIC PROFILES

(71) Applicants: AIRBUS DEFENCE AND SPACE GMBH, Taufkirchen (DE); AIRBUS OPERATIONS GMBH, Hamburg (DE)

(72) Inventors: Ralf Caspari, Kösching (DE); Robert Weichwald, Siegenburg (DE); Emanuel Ermann, Oberstimm (DE); Gerd Heller, Hamburg (DE); Detlev Konigorski, Hamburg (DE); Stefan Schnäubelt, Hamburg (DE); Nicole Jordan, Hamburg (DE)

(73) Assignees: Airbus Defence and Space GmbH, Taufkirchen (DE); Airbus Operations GmbH, Hamburg (DE)

( * ) Notice: Subject to any disclaimer, the term of this patent is extended or adjusted under 35 U.S.C. 154(b) by 36 days.

(21) Appl. No.: 15/827,580

(22) Filed: Nov. 30, 2017

(65) Prior Publication Data

US 2018/0149178 A1    May 31, 2018

(30) Foreign Application Priority Data

Nov. 30, 2016   (DE) .......................... 102016014246.4

(51) Int. Cl.
| | |
|---|---|
| *B64C 23/00* | (2006.01) |
| *F03D 1/06* | (2006.01) |
| *F15D 1/12* | (2006.01) |
| *F15D 1/00* | (2006.01) |

(52) U.S. Cl.
CPC ................ *F15D 1/12* (2013.01); *F15D 1/007* (2013.01); *F15D 1/0075* (2013.01); *B64C 23/005* (2013.01); *B64C 2230/12* (2013.01); *F03D 1/0641* (2013.01); *F05B 2240/21* (2013.01); *F05B 2240/30* (2013.01); *Y02T 50/10* (2013.01)

(58) Field of Classification Search
CPC ...... F15D 1/0065; F15D 1/007; F15D 1/0075; F15D 1/12; F03D 1/0641; F03D 1/0683; B64C 23/005; B64C 2230/12; F05B 2240/21; F05B 2240/30; F05B 2240/31; F01D 5/145

See application file for complete search history.

(56) References Cited

U.S. PATENT DOCUMENTS

| | | | |
|---|---|---|---|
| 4,516,747 A  * | 5/1985 | Lurz ....................... | B64C 23/00 |
| | | | 244/130 |
| 5,206,806 A | 4/1993 | Gerardi et al. | |
| 7,104,116 B2 * | 9/2006 | Discenzo ........... | G01N 33/2888 |
| | | | 73/290 R |

(Continued)

OTHER PUBLICATIONS

Erfani, R. et al., "Development of DBD plasma actuators: The double encapsulated electrode", 2015, Elsevier Ltd, p. 133 (Year: 2015).*

(Continued)

*Primary Examiner* — Woody A Lee, Jr.
(74) *Attorney, Agent, or Firm* — Jenkins, Wilson, Taylor & Hunt, P.A.

(57) ABSTRACT

An assembly for arrangement to the surface of an aerodynamic profile comprises an array of actuators, which are designed as piezo actuators and plasma actuators.

20 Claims, 15 Drawing Sheets

(56) References Cited

U.S. PATENT DOCUMENTS

| | | | |
|---|---|---|---|
| 7,624,941 B1 * | 12/2009 | Patel | B62D 35/007 244/3.22 |
| 2008/0061192 A1 * | 3/2008 | Sullivan | B64C 21/10 244/200 |
| 2009/0097976 A1 | 4/2009 | Driver et al. | |
| 2009/0224104 A1 * | 9/2009 | Tenebre | B64D 15/163 244/134 R |
| 2010/0018322 A1 * | 1/2010 | Neitzke | B64C 23/06 73/861.22 |
| 2010/0224733 A1 | 9/2010 | Wood et al. | |
| 2010/0301702 A1 * | 12/2010 | Tao | H01L 41/044 310/318 |
| 2012/0193483 A1 * | 8/2012 | Essenhigh | B64C 23/005 244/205 |
| 2013/0291979 A1 | 11/2013 | Nordin et al. | |

OTHER PUBLICATIONS

Erfani et al., "Development of DBD plasma actuators: The double encapsulated electrode", Acta Astronautica, vol. 109 (2015), pp. 132-143, published by Elsevier Ltd. on behalf of IAA, XP002777396.

Eurpoean Patent Office, Extended European Search Report for European Patent application EP1720433.4 dated Feb. 2, 2018.

Carazo, A.V., "Piezoelectric Transformers: An Historical Review", MOPI, Actuators 2016, 5, 12, pp. 1-22; website: www.mdpi.com/journal/actuators.

European Office Action for Application No. 17204733.4 dated Apr. 10, 2019.

European Office Action for Application No. 17204733.4 dated Dec. 10, 2019.

* cited by examiner

ACTUATORS FOR FLOW CONTROL AT SURFACES OF AERODYNAMIC PROFILES

CROSS-REFERENCE TO PRIORITY APPLICATION

This application claims the benefit of, and priority to, German patent application number 102016014246.4, filed Nov. 30, 2016. The content of the referenced application is incorporated by reference herein.

TECHNICAL FIELD

The invention relates to actuators of the above-mentioned type, which are designed for a flow control, and namely for control of boundary layers or flows of fluids in proximity to walls, in particular of air, that flow past the actuators. By this, e.g. the characteristics of aerodynamic profiles, such as airfoils or control surfaces of aircraft, in particular of planes, as well as of blades of wind turbines, can be changed in multiple ways and manners and can be optimized.

BACKGROUND

Flow control through plasma actuators has been proposed by S. Grundmann et al., "Plasma zur Strömungskontrolle, Wissenschaftsmagazin der TU Darmstadt", fall 2009, pages 64-67", which actuators are realized as DBD actuators (DBD: dielectric barrier discharge; referred to as DBE in the German language use: "dielektrische Barriereentladung").

The influencing of the flow over airfoils of aircraft has also been proposed by R. Erfani et al., Development of DBD plasma actuators: The double encapsulated electrode, Acta Aeronautica 109 (2015), pages 132-143, publisher ELSEVIER. There, DBD actuators having an encapsulated electrode (SDBD actuator) or multiple encapsulated electrodes (MEE actuators) are described. In the most simple case of an SDBD actuator an exposed electrode is provided, which is connected to a high-voltage power supply (typically in the kV range), which is operated with an AC (or pulsed) voltage (typically with an AC voltage in the kHz range).

The exposed electrode is arranged at the top of a dielectric layer, wherein at its underside an encapsulated electrode is provided, which is electrically connected to ground. The complete DBD actuator is placed on a substrate.

During the operation of the DBD actuator at the exposed electrode a plasma is created from the ambient air, i.e. ionized air, which consists of ions and electrons.

Furthermore, piezo elements as actuators are known, at which a small plate made from a piezoelectric crystal or a piezoelectric ceramics is enclosed between two electrodes. When an electric voltage is applied, a mechanical motion is created (piezo actuator, so-called inverse piezo effect), or when a mechanical force acts on it, an electric voltage between the electrodes is created (piezo effect).

BRIEF SUMMARY

The invention is based on the object to provide actuators, which cover a wide range of application, which allows further potential influence in addition to the flow control.

At first, the invention is based on the insight that at least some such actuators mentioned above, but also respectively designed sensors, may be designed as so-called micro systems with smallest measures in the range of micrometers. Internationally, the term MEMS systems is established (MEMS: micro electro-mechanical system).

Further, the invention is based on the insight that in addition to the flow control, actuators with suitable design are also usable for cleaning the surface of an aerodynamic profile and/or for measuring local aerodynamic parameters.

In this regard, the term "cleaning of surfaces" is to be understood broadly and, besides the actual cleaning, exemplarily includes the removal of contaminations, the prevention of accumulations on a surface or exemplarily the prevention or removal of an ice accumulation on a surface.

Also the term "use as sensors for measuring local aerodynamic parameters" is to be understood broadly and exemplarily includes the measuring of compressive forces or shear forces, of flow directions, temperatures or flow conditions.

The object is met by an assembly having MEMS actuators with the features provided in claim 1, wherein the assembly is arrangeable on the surface of an aerodynamic profile. Advantageous embodiments of the invention are given in the depending claims.

According to the invention an assembly having an array is provided, which comprises a combination of piezo elements and DBD elements (designed or used as actuators and/or measuring elements), wherein at least one of the both types of actuators (piezo and DBD) is realized in MEMS technology.

Additionally, surface elements may be provided on the surface of the assembly, preferably with bionic structures, e.g. in form of a ribbed structure (so-called "shark skin") for reducing the flow resistance or for maintaining a minimum boundary layer thickness. Other bionic structures may serve for accomplishing a lotus effect to prevent or at least reduce the adhesion of contaminations.

A bionic structure may also be designed for reaching the energy efficiency of the ionization of the fluid that flows past, or to reduce the wear of the actuators.

The actuators may also be utilized as sensors. For this one or multiple operating parameters are measured, for example the operating current and/or the operating voltage. From this, conclusions e.g. about the extent of contamination or icing can be drawn.

If a piezo actuator is operated as a generator, conclusions about aerodynamic parameters can be drawn through measuring the operating parameters of the idle voltage.

One or multiple pairs of two piezo actuators coupled with each other may be provided. The first piezo actuator is excited to oscillations through a pair of electrodes. The second piezo actuator is coupled with the first actuator and from the oscillations at one of its both electrodes creates a high electrical voltage (so-called "piezo transformer"), which is utilizable for ionizing the fluid that flows past.

BRIEF DESCRIPTION OF THE DRAWINGS

In the following, the invention is further explained on the basis of graphically presented embodiments, from which further advantages and features are apparent. It is shown.

DETAILED DESCRIPTION

Figure 1:
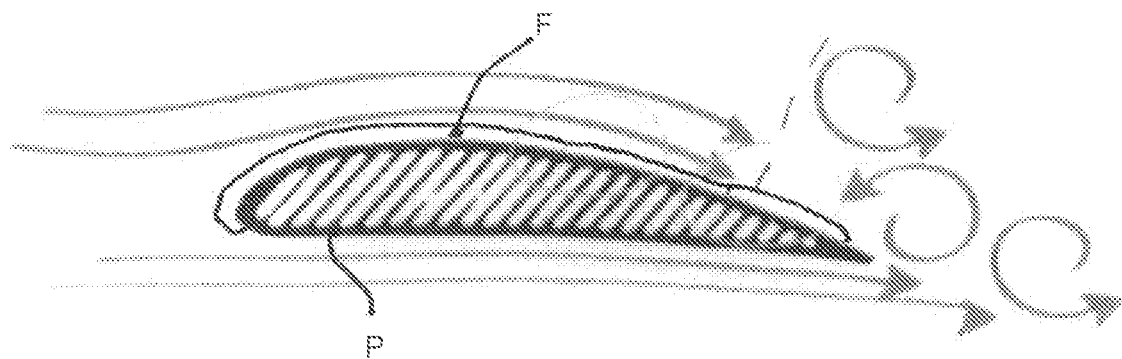
FIG. 1 shows an aerodynamic profile with an assembly embedded into a foil arranged on its surface.

In FIG. 1 an aerodynamic profile P having a foil F is shown, into which an assembly having plasma actuators and piezo actuators is embedded. The flow of a surrounding air flow is illustrated by arrows.

Figure 2:
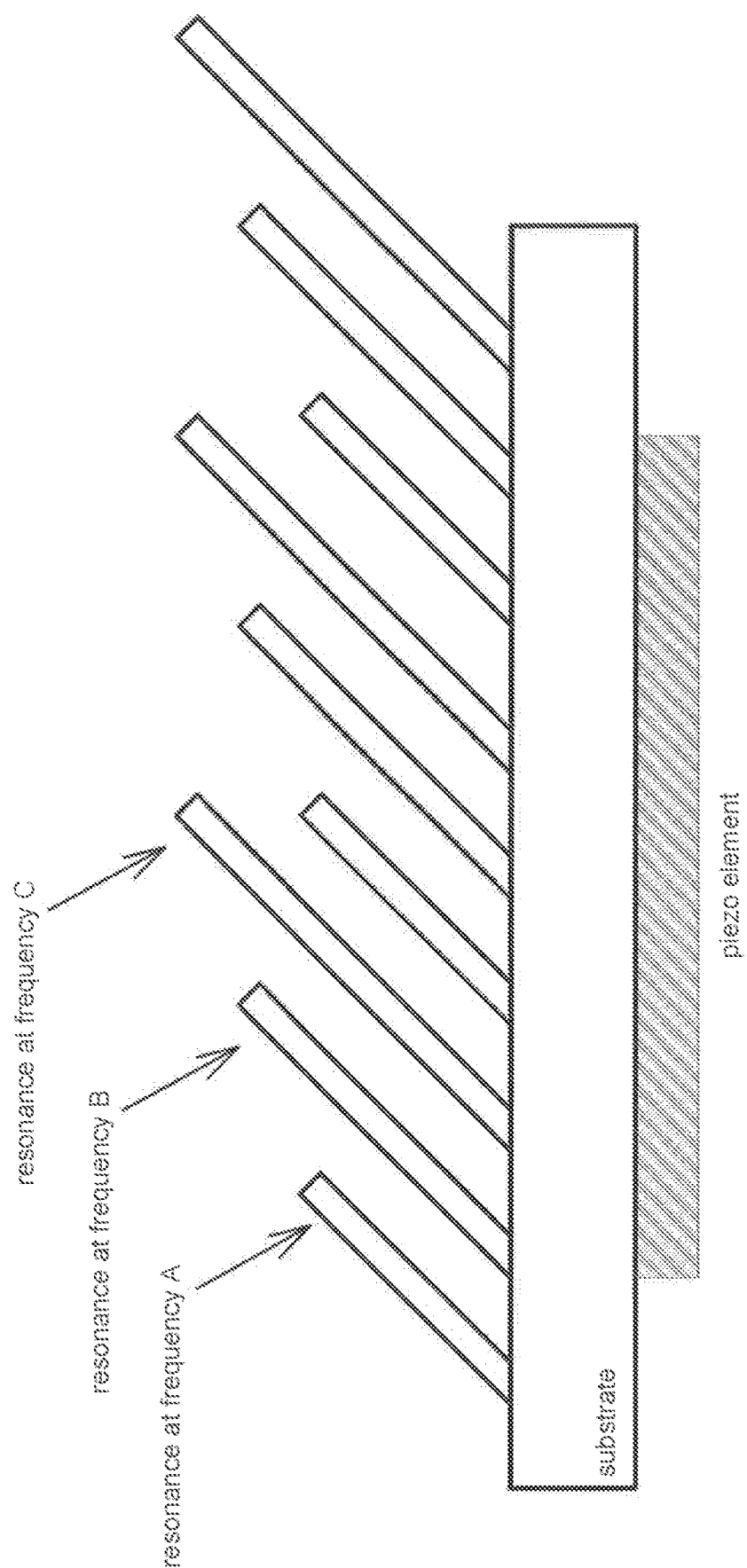
FIG. 2 a piezo actuator with a brush-like structure for achieving a resonance effect.

FIG. 2 shows an assembly having a piezo actuator. In the surface of a substrate surface elements are provided, which comprise different resonance frequencies A, B and C.

Figure 3:
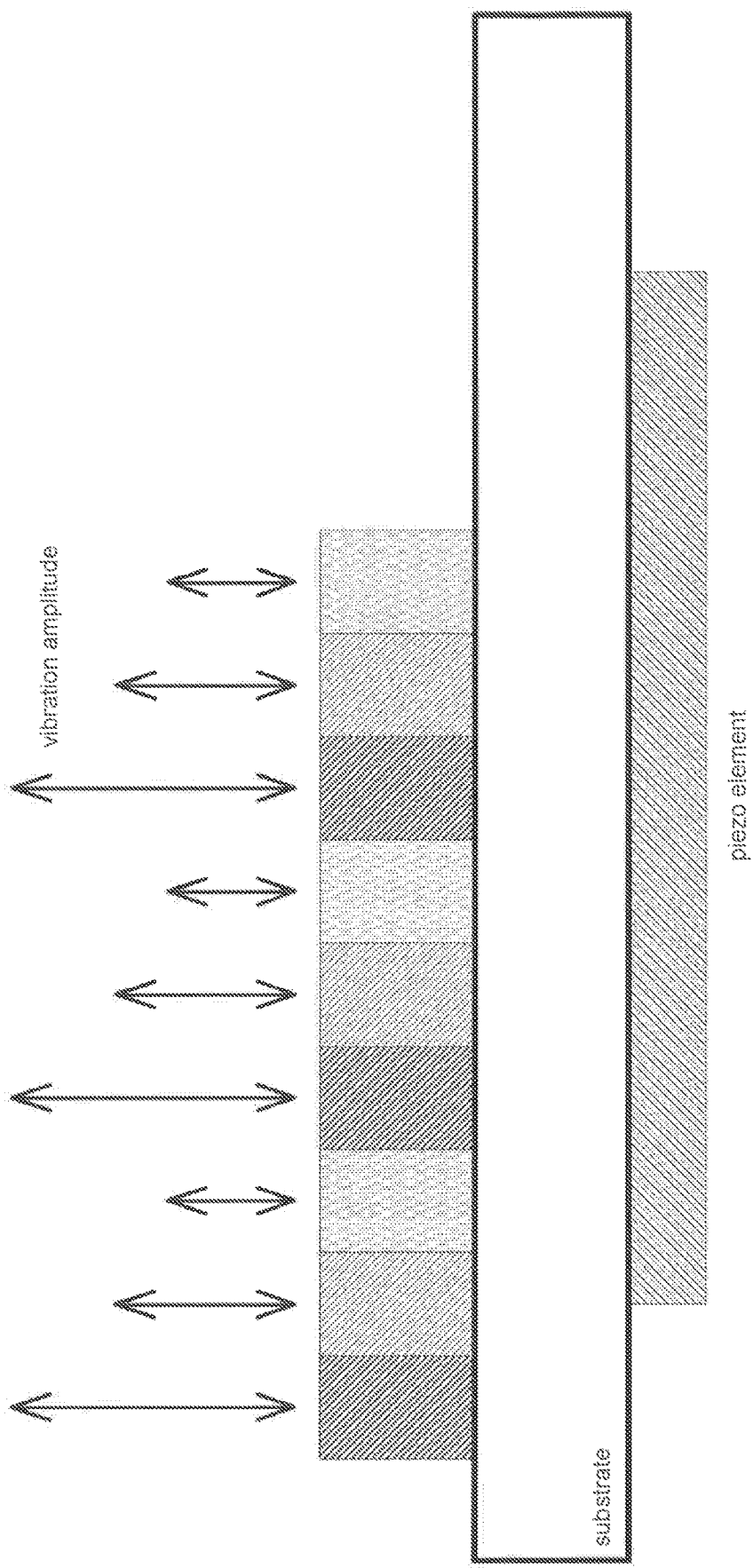
FIG. 3 a piezo actuator with an arrangement of materials having different modules of elasticity to create shear forces by a varying vibration dampening.

In the assembly illustrated in FIG. 3 a piezo actuator is provided underneath a substrate, wherein surface elements from different materials are provided at the substrate surface, the surface elements accordingly comprising different vibration amplitudes, when they are excited by the actuator.

Figure 4:
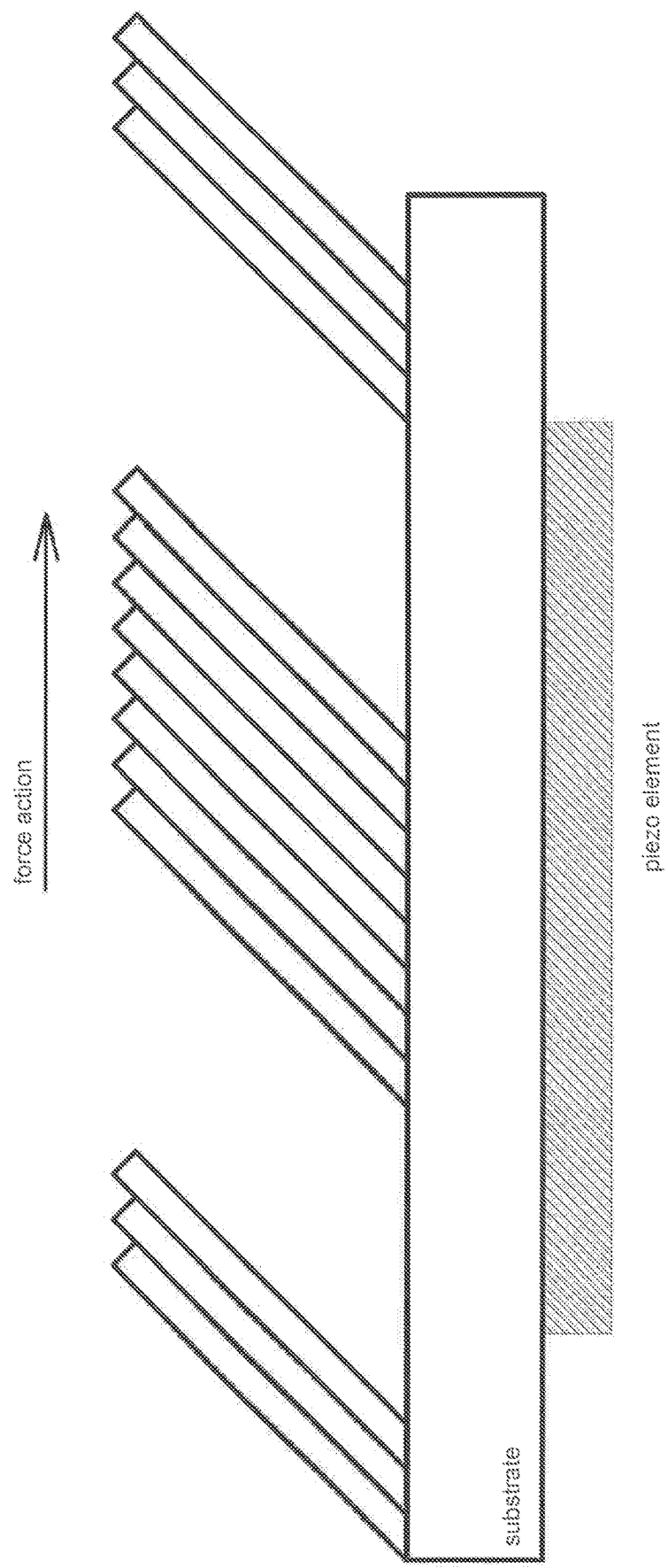
FIG. 4 a piezo actuator having a brush-like structure for creating longitudinal forces.

A similar assembly is illustrated in FIG. 4, wherein, however, groups of surface elements are provided for achieving a force action in a longitudinal direction (direction of the arrow).

Figure 5:
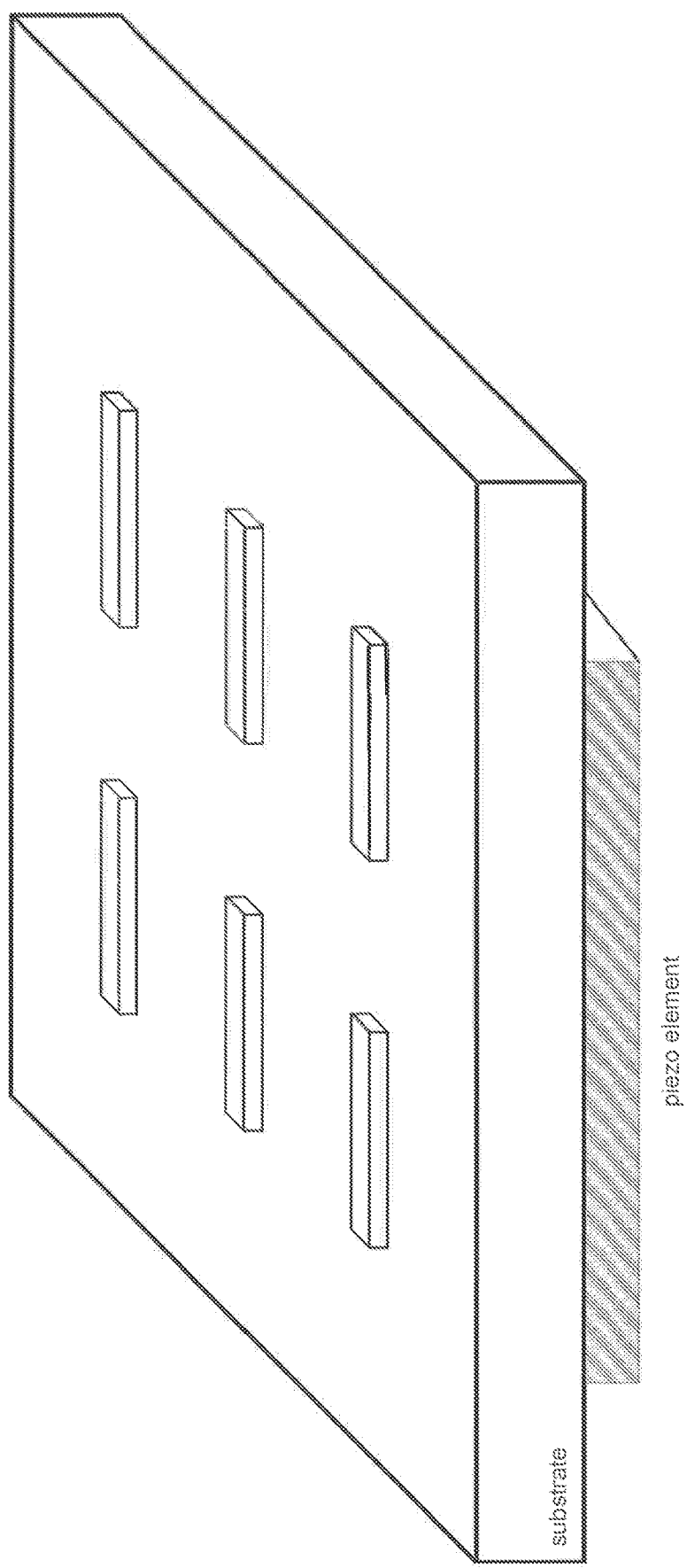
FIG. 5 a piezo actuator with an embedded hard material such as ceramics to create shear and torsion forces from the bending vibration of the piezo actuator.

In the assembly of FIG. 5, six bar-shaped ceramics components are embedded into the surface.

Figure 6:
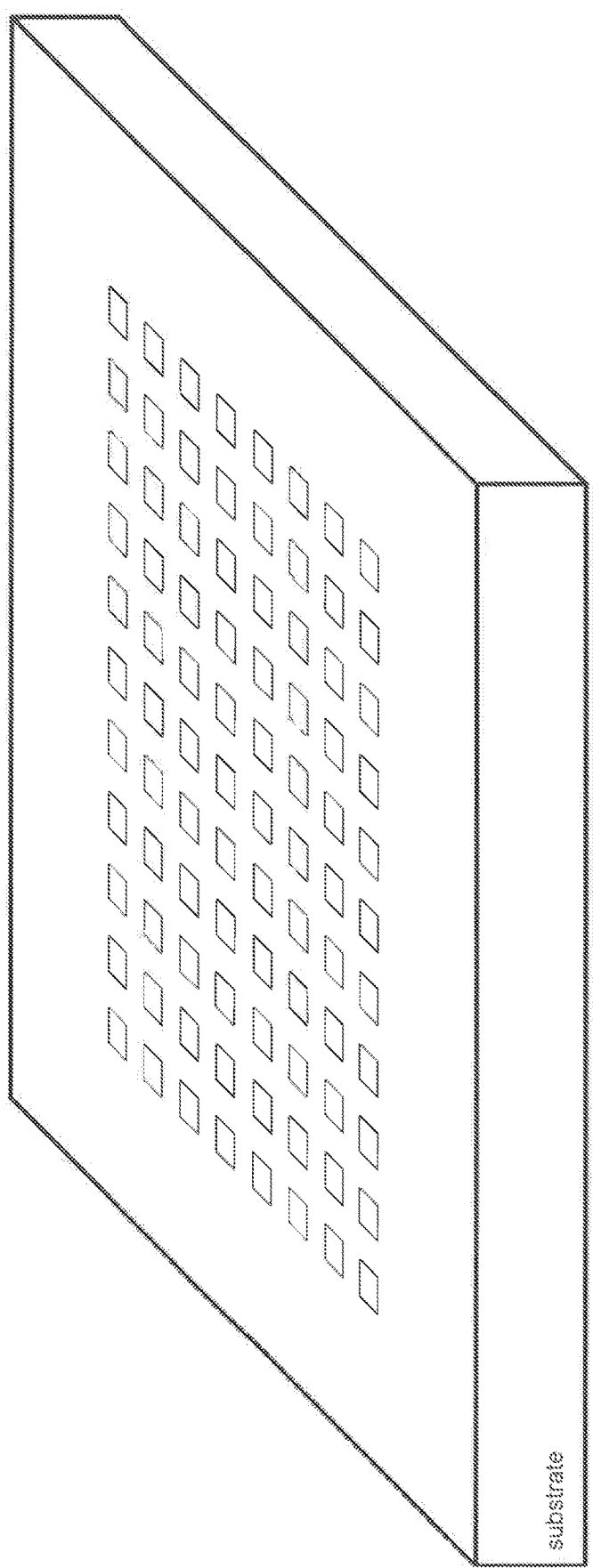
FIG. 6 an assembly having an array of 8×11 actuators on the top side.
Figure 7:
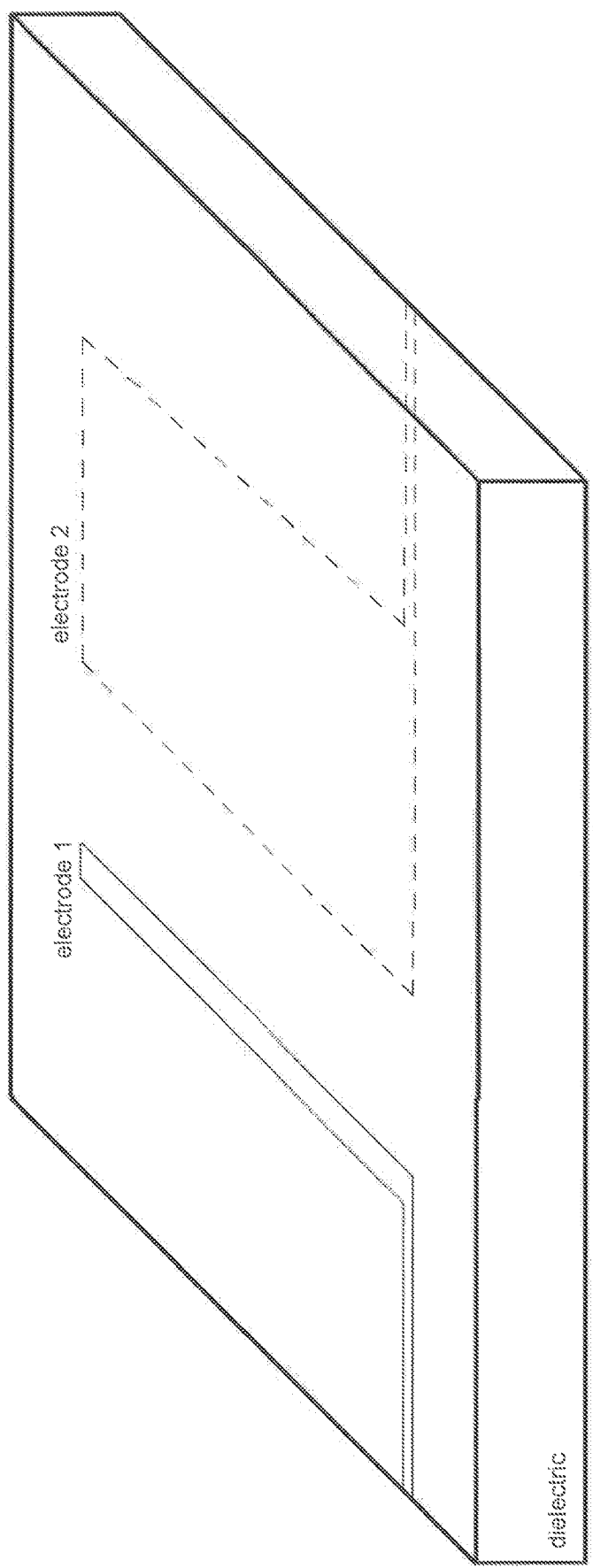
FIG. 7 a schematic illustration of a plasma actuator having two electrodes.

FIG. 6 shows an assembly having a regular array of 6×8 actuators (piezo and plasma actuators);

FIG. 7 schematically shows a plasma actuator (DBD actuator) having a dielectric and two electrodes, wherein electrode 1 is provided at the top side and electrode 2 at the bottom side.

Figure 8:
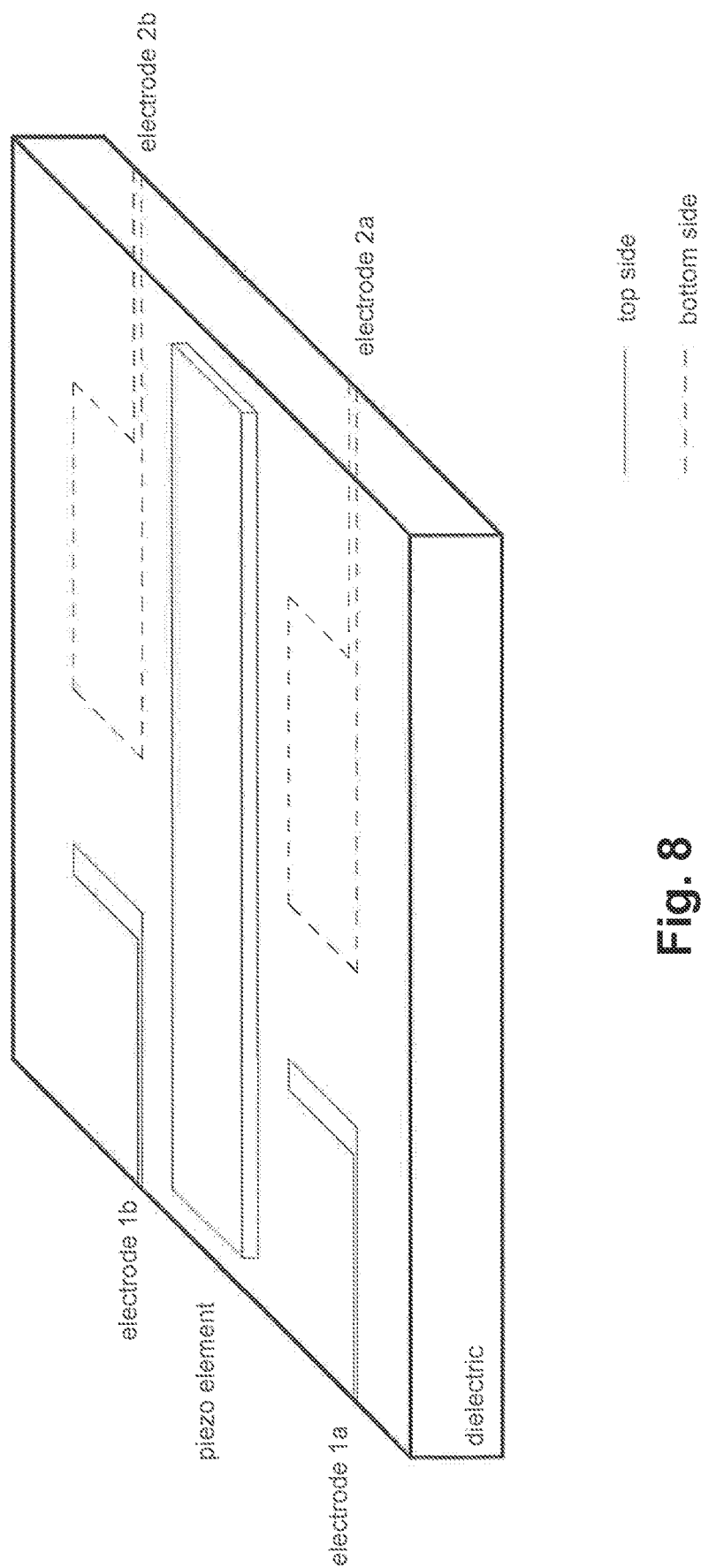
FIG. 8 an assembly having two plasma actuators and a piezo actuator (piezo element) arranged on the top side.

In the assembly shown in FIG. 8 two plasma actuators (with electrodes 1a, 2a and 1b, 2b respectively) are provided. Furthermore, a piezo actuator is provided on the top side of the dielectric.

Figure 9:
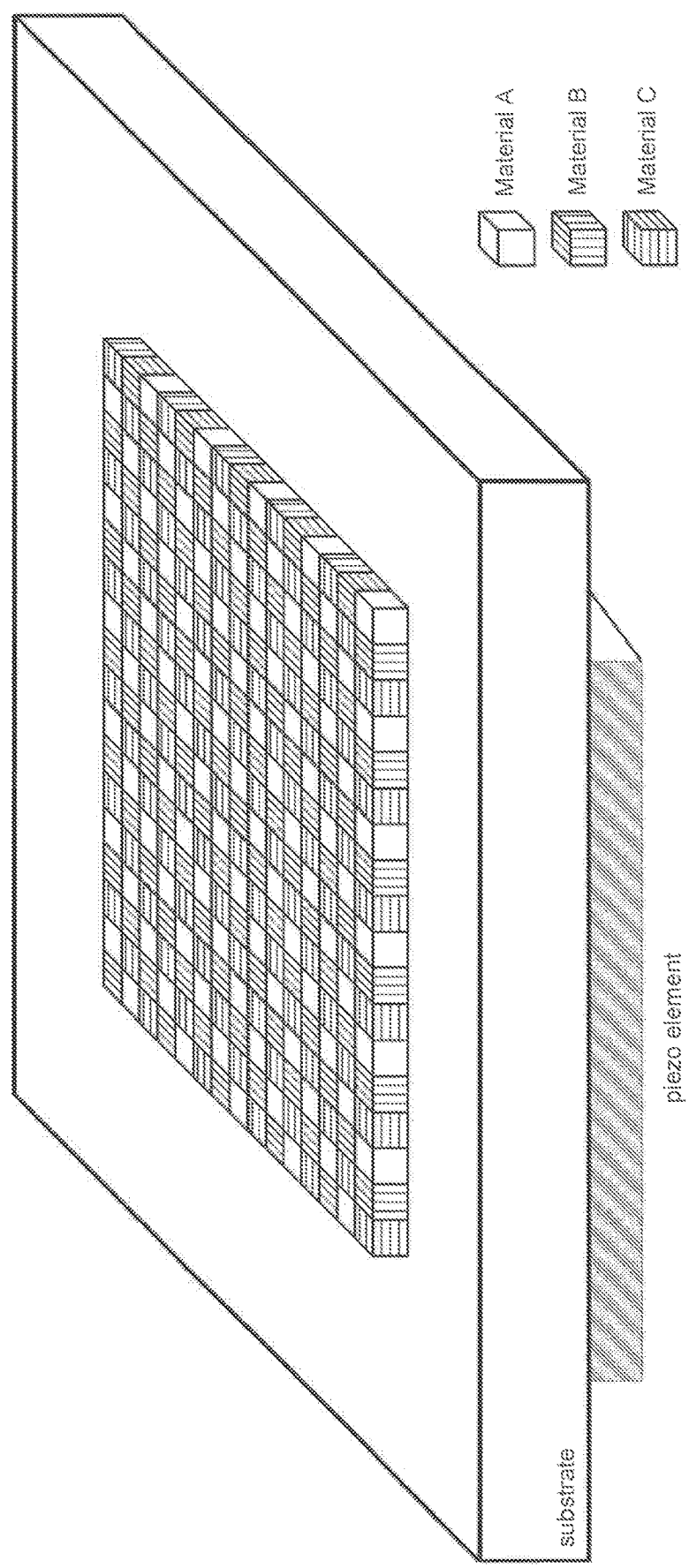
FIG. 9 an assembly having an array of surface elements from three different materials.

FIG. 9 shows an assembly having a piezo actuator at the bottom side of a substrate, wherein on the surface of the substrate a regular array from three different materials A, B and C is created with different vibration characteristics or acoustic characteristics.

Figure 10:
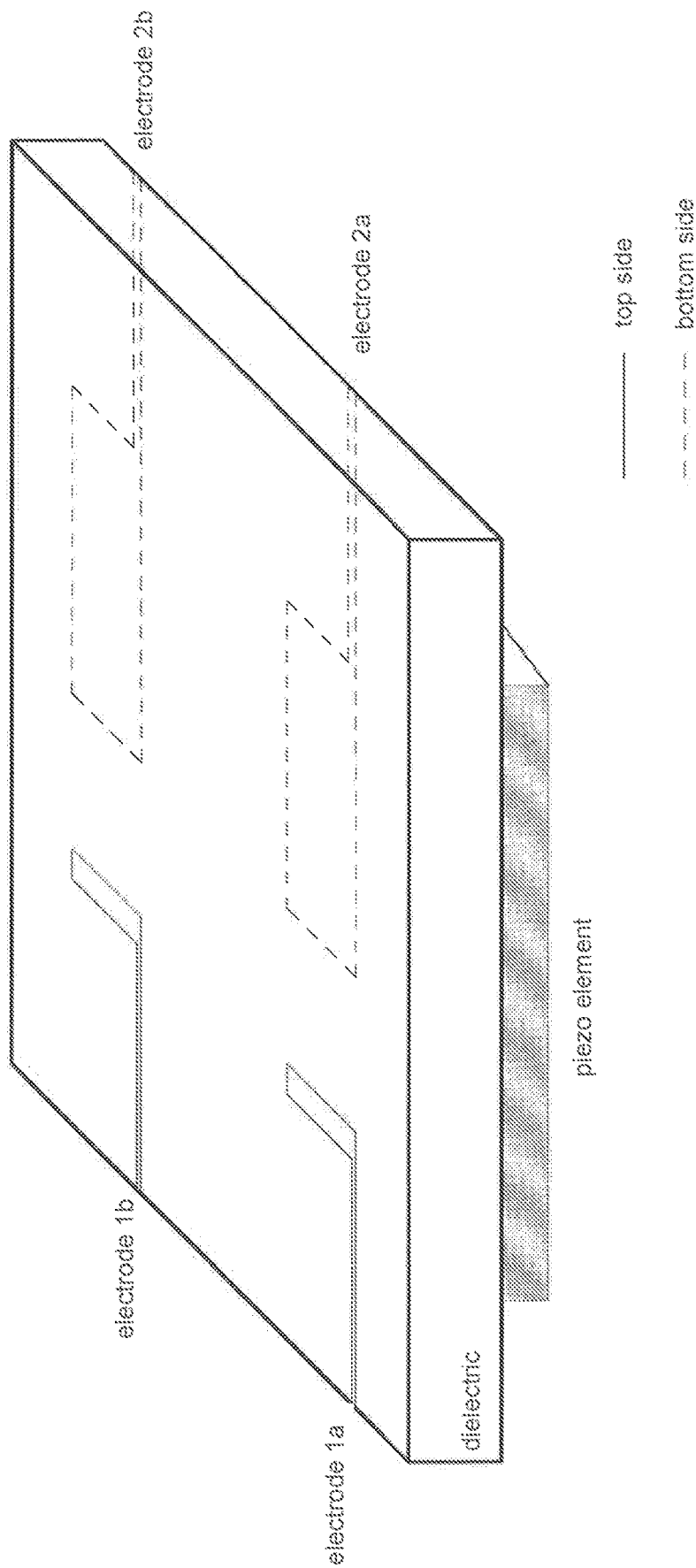
FIG. 10 an assembly having two plasma actuators and a piezo actuator.

FIG. 10 shows an assembly having two plasma actuators (electrodes 1a, 2a and 1b, 2b respectively) as well as a piezo actuator on the bottom side.

Figure 11:
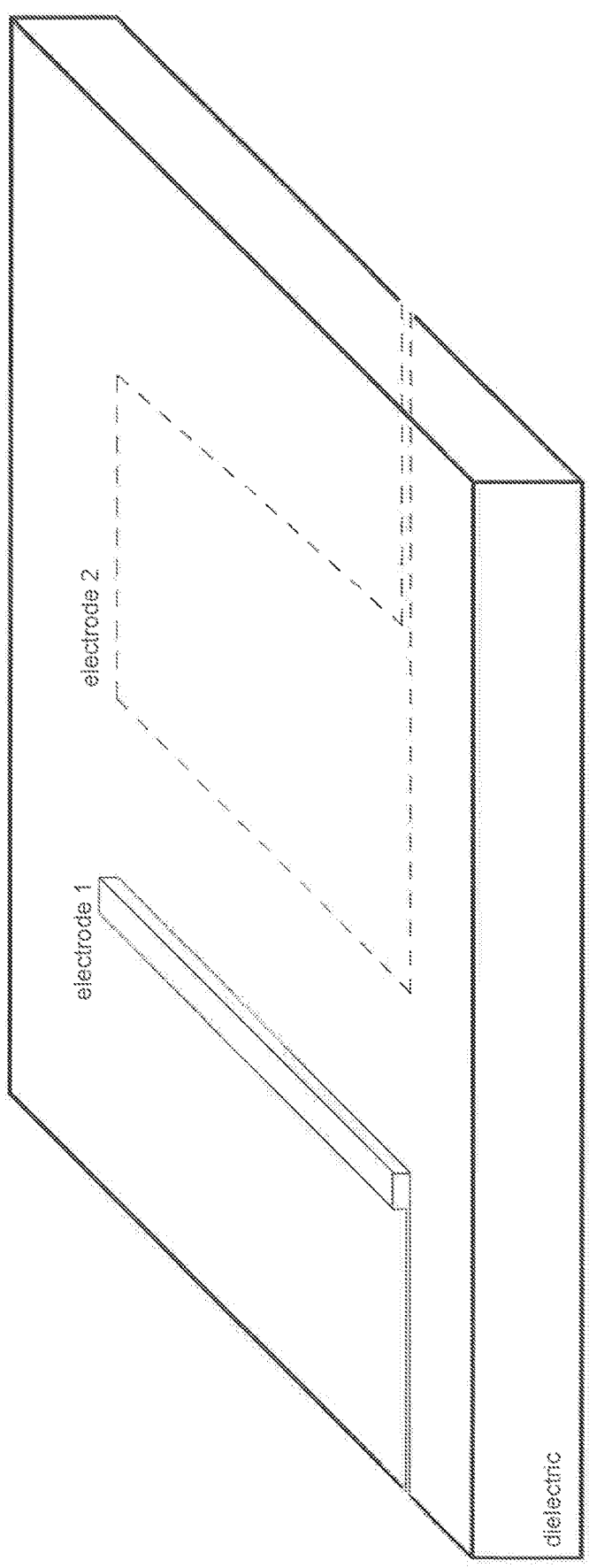
FIG. 11 a schematic illustration of a plasma actuator, wherein the upper electrode represents a piezo element at the same time.

FIG. 11 shows a schematical illustration of a plasma actuator having two electrodes 1 and 2, wherein the electrode 1 at the same time constitutes a piezo element (indicated by a thickening of the electrode 1).

Figure 12:
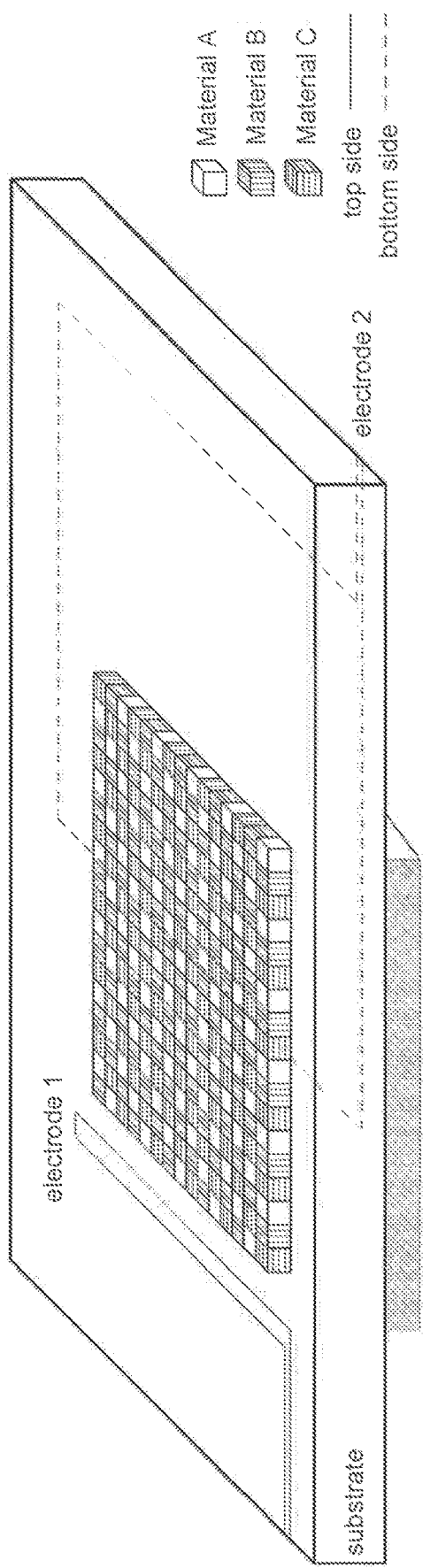
FIG. 12 an assembly having a plasma actuator and a piezo actuator as well as an array of surface elements from three different materials.
Figure 13:
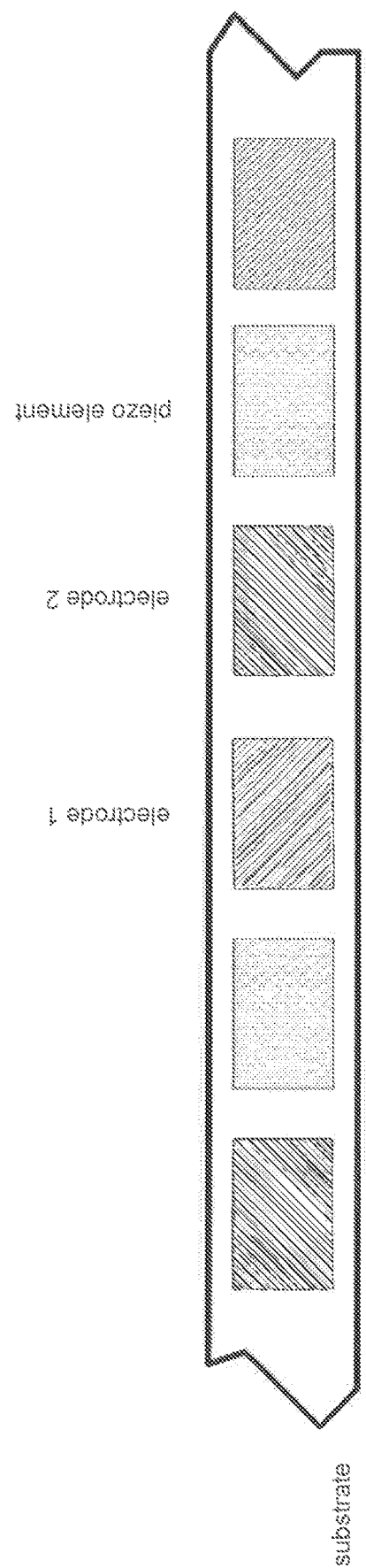
FIG. 13 a sectional view of an assembly having MEMS plasma actuators (DBD elements) in a coplanar arrangement, wherein the DBD elements alternate with piezo actuators.
Figure 14:
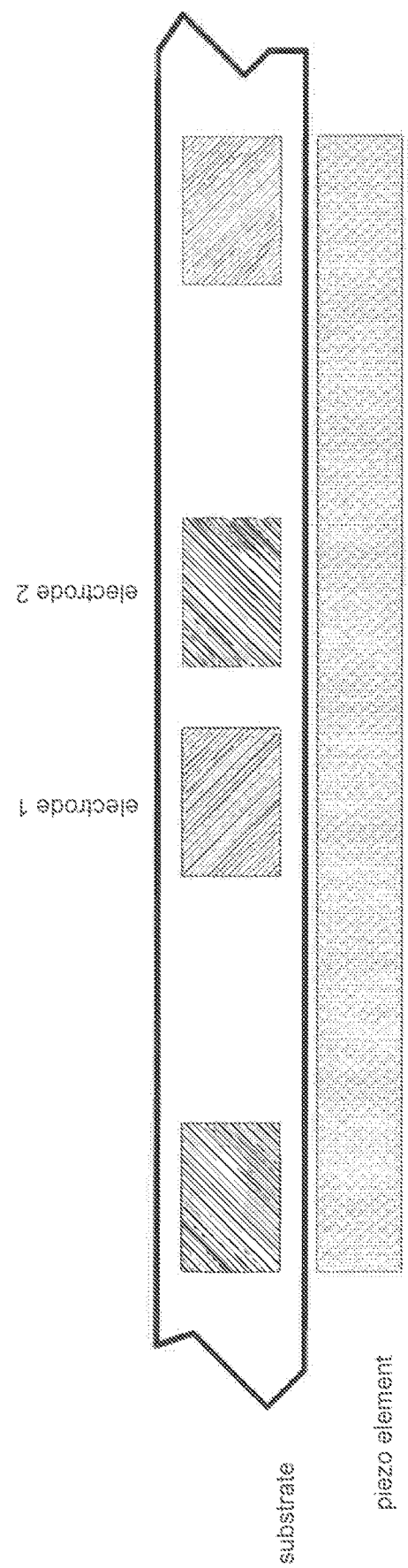
FIG. 14 a sectional view of an assembly having coplanar (microscopic, i.e. MEMS) DBD elements and macroscopic piezo actuators at the bottom side.

The FIGS. 12, 13 and 14 were explained already further above.

Figure 15:
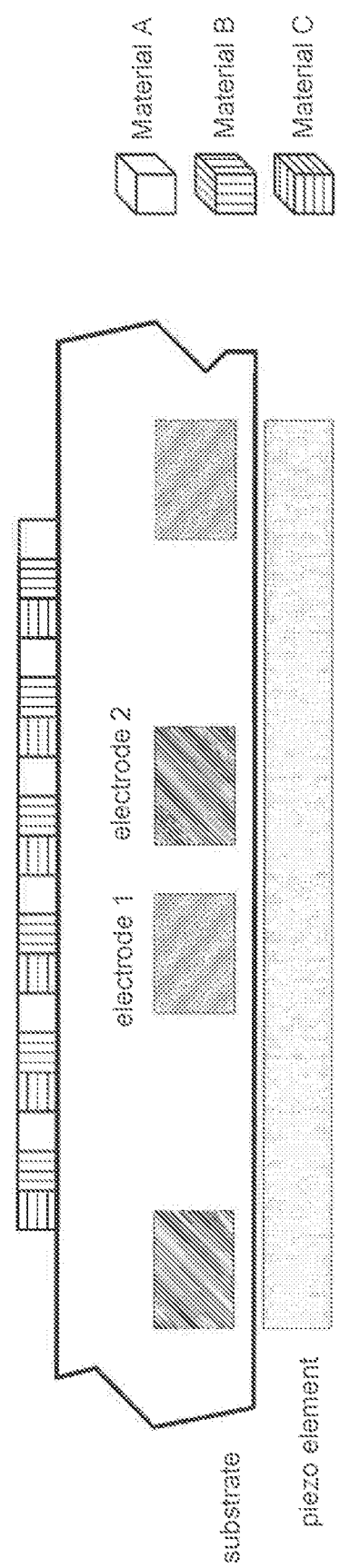
FIG. 15 a sectional view of an assembly having miniaturized (microscopic) coplanar DBD elements and macroscopic piezo actuators at the bottom side, wherein at the top side of the assembly an arrangement of materials with different acoustic characteristics is provided.

FIG. 15 shows an assembly having a plasma actuator (electrodes 1 and 2) and a piezo actuator at the bottom side. A regular array from three different materials A, B and C having different characteristics (e.g. acoustic or vibration characteristics) is provided on the surface.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The invention claimed is:

1. An assembly for arrangement in or at a surface of an aerodynamic profile, wherein the assembly comprises:
    an array of piezo actuators;
    an array of plasma actuators; and
    an arrangement of surface elements on a surface of the assembly;
    wherein the arrangement of surface elements forms a brush-like structure from first surface elements having a first resonant frequency and second surface elements having a second resonant frequency different from the first resonant frequency; or
    wherein the arrangement of surface elements includes first surface elements having a first module of elasticity and second surface elements having a second module of elasticity different from the first module of elasticity, and wherein the arrangement of surface elements is provided to create shear forces by a varying vibration dampening.

2. The assembly according to claim 1, wherein the plasma actuators are miniaturized.

3. The assembly according to claim 2, wherein the plasma actuators are SDBD or MEE actuators.

4. The assembly according to claim 1, wherein the arrays of piezo and plasma actuators comprise at least 10000 actuators per square meter.

5. The assembly according to claim 1, wherein the arrangement of surface elements forms the brush-like structure further comprises third surface elements having a third resonant frequency different from the first and second resonant frequencies.

6. The assembly according to claim 1, wherein the arrangement of surface elements includes third surface elements having a third module of elasticity different from the first and second modules of elasticity.

7. The assembly according to claim 1, wherein the array of plasma actuators includes at least a pair of two piezo actuators mechanically coupled with each other for creating a piezo transformer.

8. The assembly according to claim 1, wherein individual plasma actuators from the array of plasma actuators are arranged alternatingly with individual piezo actuators from the array of piezo actuators.

9. A foil comprising one or more assemblies according to claim 1 embedded within the foil.

10. The assembly according to claim 1, wherein sets of at least two individual plasma actuators from the array of plasma actuators are arranged alternatingly with sets of at least two individual piezo actuators from the array of piezo actuators.

11. The assembly according to claim 1, wherein at least one plasma actuator in the array of plasma actuators includes a first electrode and a second electrode, and wherein the first electrode forms one of the piezo actuators in the array of piezo actuators.

12. The assembly according to claim 1, wherein each plasma actuator in the array of plasma actuators includes a first electrode and a second electrode, and wherein the electrodes in each plasma actuator in the array of plasma actuators are co-planar with the array of piezo actuators.

13. The assembly according to claim 12 wherein each first electrode and each second electrode is directly adjacent to a piezo actuator in the array of piezo actuators.

14. The assembly according to claim 1 wherein the assembly has a top side and a bottom side, wherein each plasma actuator in the array of plasma actuators is located on the top side of the assembly, and wherein each piezo actuator in the array of piezo actuators is located on the bottom side of the assembly.

15. The assembly according to claim 14 wherein the arrangement of surface elements is on the surface of the top side of the assembly.

16. The assembly according to claim 1, wherein the arrangement of surface elements forms a brush-like structure configured to create a longitudinal force in a direction parallel to a plane defined by the surface of the assembly.

17. A method for measuring an operating parameter, the method comprising:
arranging an assembly on a surface of an aerodynamic profile, the assembly comprising:
an array of piezo actuators;
an array of plasma actuators; and
an arrangement of surface elements on a surface of the assembly; and
using a selected actuator to measure a local aerodynamic parameter;
wherein the arrangement of surface elements forms a brush-like structure from first surface elements having a first resonant frequency and second surface elements having a second resonant frequency different from the first resonant frequency; or
wherein the arrangement of surface elements includes first surface elements having a first module of elasticity and second surface elements having a second module of elasticity different from the first module of elasticity, and wherein the arrangement of surface elements is provided to create shear forces by a varying vibration dampening.

18. The method of claim 17, wherein using the selected actuator to measure the local aerodynamic parameter comprises measuring compressive or shear forces.

19. The method of claim 17, wherein using the selected actuator to measure the local aerodynamic parameter comprises measuring temperatures.

20. The method of claim 17, wherein using the selected actuator to measure the local aerodynamic parameter comprises measuring flow conditions.

* * * * *